United States Patent
Miyamura et al.

(10) Patent No.: US 6,733,124 B2
(45) Date of Patent: May 11, 2004

(54) CONTACT LENS

(75) Inventors: Kazuya Miyamura, Kasugai (JP); Keiji Sugimoto, Kasugai (JP); Tadashi Sawano, Aichi-ken (JP)

(73) Assignee: Menicon Co., Ltd. (JP)

( * ) Notice: Subject to any disclaimer, the term of this patent is extended or adjusted under 35 U.S.C. 154(b) by 0 days.

(21) Appl. No.: 10/102,475

(22) Filed: Mar. 20, 2002

(65) Prior Publication Data

US 2002/0163620 A1 Nov. 7, 2002

(30) Foreign Application Priority Data

Mar. 21, 2001 (JP) .................................. 2001-081556
Jan. 22, 2002 (JP) .................................. 2002-013081

(51) Int. Cl.$^7$ ................................ G02C 7/04
(52) U.S. Cl. ....................................... 351/161
(58) Field of Search .............................. 351/160 R, 161

(56) References Cited

U.S. PATENT DOCUMENTS

| 4,561,737 A | * | 12/1985 | Bourset et al. | ......... 351/160 R |
| 4,952,045 A | | 8/1990 | Stoyan | .................... 351/160 R |
| 5,428,412 A | * | 6/1995 | Stoyan | ........................ 351/177 |

* cited by examiner

*Primary Examiner*—Scott J. Sugarman
*Assistant Examiner*—Darryl J. Collins
(74) *Attorney, Agent, or Firm*—Rossi & Associates

(57) ABSTRACT

Disclosed is a contact lens having a back surface to be placed on a cornea. The back surface includes a generally circular central zone whose radius of curvature gradually decrease from its center toward its periphery, and an peripheral zone disposed around the central zone.

12 Claims, 3 Drawing Sheets

CONTACT LENS

INCORPORATED BY REFERENCE

The disclosure of Japanese Patent application No. 2001-081556 filed on Mar. 21, 2001, and No. 2002-013081 filed on Jan. 22, 2002 including the specifications, drawings and abstracts is incorporated herein by reference in its entirety.

BACKGROUND OF THE INVENTION

1. Field of the Invention

The present invention relates generally to contact lenses adapted to be worn on a surface of an eyeball and including a generally circular central zone serving for providing an optical zone and an annular peripheral zone disposed around the central zone. More particularly, the present invention is concerned with such a contact lens that is novel in construction and that permits an enhanced lens wearing comfort as felt by a lens wearer.

2. Description of the Related Art

There is known a contact lens that is worn on a surface of a cornea of a human eye for treating myopia, hyperopia, astigmatism, presbyopia and the like. Since the contact lens is worn on the cornea accompanied with contact thereof with very sensitive surfaces of the cornea and eyelids of a lens wearer, it is material to ensure an excellent wearing comfort as felt by the lens wearer.

In general, the contact lens includes a generally circular central zone serving for providing an optical zone that transmits light to a pupil, and an annular peripheral zone integrally disposed radially outward of the central zone and serving for placing the contact lens on a predetermined position of the cornea. The peripheral zone is designed to permit a good circulation of tear fluid existing between the cornea and the contact lens. The contact lens has a back surface whose radius of curvature is substantially equal to that of the surface of the cornea of the lens wearer so that the back surface of the contact lens may suitably conform to the shape of the cornea of the lens wearer. Generally, this radius of curvature of the back surface of the contact lens is referred to as a base curve.

However, such a conventional contact lens as described above gives rise to a problem of discomfort as felt by the contact lens wearer when he or she wear the lens, although degrees of the discomfort may vary among individual wearers. In particular, a conventional contact lens of hard or rigid type gives the lens wearer a relatively large wearing discomfort. Thus, the conventional contact lens is insufficient to assure a good wearing comfort thereof.

In addition, the conventional hard contact lens is likely to suffer from a problem that dusts or other floating objects in the atmosphere are introduced into the tear fluid existing between the contact lens and the cornea. This results in significant deterioration of the lens wearing comfort as felt by the lens wearer, and sometimes gives rise to a burden on the lens wearer to remove the contact lens to wash it.

SUMMARY OF THE INVENTION

It is therefore an object of this invention to provide a contact lens which is novel in structure, and which is capable of eliminating or minimizing a discomfort as felt by a contact lens wearer when he or she wear the contact lens, and assuring an improved wearing condition of the lens, while preventing an entrance of the dust or the like into a tear fluid layer existing between the lens and the cornea.

The above and/or other objects of this invention may be attained according to at least one of the following modes of the invention. Each of these modes of the invention is numbered like the appended claims and depends from the other mode or modes, where appropriate, to indicate possible combinations of elements or technical features of the invention. It is to be understood that the principle of the invention is not limited to those modes of the invention and combinations of the technical features, but may otherwise be recognized based on the thought of the present invention that disclosed in the whose specification and drawings or that may be recognized by those skilled in the art in the light of the disclosure in the whole specification and drawings.

(1) A contact lens having a back surface adapted to face a cornea, wherein the back surface including (a) a generally circular central zone and (b) an peripheral zone disposed around the central zone, the central zone having a radius of curvature gradually decreasing from a center thereof toward a periphery thereof.

In the contact lens according to this mode of the invention, the radius of curvature of the back surface gradually decreases with an increase in a radial or lateral distance from the center of the central zone that serves for providing an optical zone. In this arrangement, the back surface of the central zone has a curve that is made gradually steeper from its center toward its periphery, so that a protrusion protruding backward of the contact lens, namely, protruding toward the side of the cornea is formed on the periphery of the central zone. The protrusion extends in a circumferential direction of the contact lens so as to surround the central zone. With the contact lens worn on a cornea of a lens wearer, this protrusion protrudes toward the cornea from the back surface of the contact lens, and is located closely adjacent to a surface of the cornea. In the presence of the protrusion, a tear fluid layer existing between the back surface of the contact lens and the cornea is narrowed or constricted at the peripheral portion of the central zone where the protrusion protrudes toward the cornea. Thus, the back surface of the contact lens is located closely adjacent to the surface of the cornea at this protrusion.

Accordingly, the contact lens of this mode of the invention permits an improved lens wearing comfort as felt by the lens wearer. In addition, since the protrusion partially narrows the tear fluid layer at the outer circumferential portion of the contact lens, unfavorable entrance of dusts or other floating objects in the atmosphere into the tear fluid layer is effectively limited or minimized, thus assuring an enhanced usability of the contact lens. It is presumed that these advantages of the present contact lens, namely, the improved lens wearing comfort and the limited entrance of the dusts into the tear fluid layer, stem from the following technical basis or reasons. Namely, the narrowed portion of the tear fluid layer located at the peripheral portion of the central zone may function as a barrier to the unfavorable entrance of the dusts into the tear fluid. In addition, the protrusion disposed at the periphery of the central zone and adapted to be located closely adjacent to the surface of the cornea may lead the contact to be desirably positioned relative to the cornea. That is, the presence of the protrusion may limit an amount of displacement of the contact lens relative to the cornea, when the lens wearer blinks, for example. Therefore, the contact lens of this mode of the invention enables to decrease or moderate discomfort as felt by the lens wearer due to friction between the contact lens and eyelid and/or cornea caused by the displacement of the contact lens relative to the cornea. Further, since a clearance between the back surface of the contact lens and the cornea is narrowed at a radially outward portion of the central zone, unfavorable entrance of the dust or contaminants accompanied with a circulation of the tear fluid may be prevented or limited.

With the contact lens of this mode of the invention worn on the cornea, the protrusion formed at the periphery of the central zone is pressed onto the surface of the cornea upon application of an external pressing force on a front surface of the contact lens. Such an external pressing force is applied on the front surface of the contact lens, by the eyelids of the lens wearer, when the lens wearer blinks, for example. As a result, the back surface of the contact lens is located adjacent to the surface of the cornea as close as possible, making it possible to restrict the displacement of the contact lens relative to the cornea. In this respect, the presence of the protrusion does not adversely effect on optical characteristics of the contact lens, since the optical zone is provided on a central portion of the center zone of the contact lens.

This mode of the present invention is preferably applicable to a rigid gas permeable lens (RGPL) so that a sufficient amount of oxygen permeated through the contact lens is applied to the cornea, even if an amount of circulation of the tear fluid existing between the cornea and the contact lens is decreased. The principle of this mode of the invention is also applicable to a soft contact lens and a hard contact lens, which are made of polymethyl metacrylate (PMMA). Further, the principle of the present invention may be applicable to various kinds of known contact lens to be worn on the cornea for treating myopia, hyperopia, astigmatism, or the other disability or disease of a person's eye.

(2) A contact lens according to the above-indicated mode (1), wherein the central zone has an outer circumferential portion adapted to cooperate with a surface of the cornea to form an annular tear fluid reserving portion therebetween, and a central portion adapted to apply pressure on the surface of the cornea in order to reshape the cornea. In this mode of the invention, the central portion of the central zone is adapted to apply a pressing force on a central portion of the surface of the cornea, to thereby reshape the cornea. Since a refraction power of the cornea itself is desirably changed due to the reshaping of the cornea, the contact lens of this mode is capable of exhibiting a myopia correction effect according to a so-called "orthokeratology" treatment. As disclosed in U.S. Pat. No. 4,952,045, for example, operations, effects or usage of the contact lens in the orthokeratology treatment are well known in the arts. For this reason, no detail description of this matter is provided for the sake of simplicity of the description.

(3) A contact lens according to the above-indicated mode (1) or (2), wherein the central zone has an ellipsoidal shape in diametrical cross section of the contact lens, whose minor axis extends substantially parallel to a center axis of the contact lens. This mode of the invention is effective to provide a contact lens having the central zone formed with a smooth surface whose radius of curvature gradually decreases from its center toward its periphery in the radially or laterally outward direction thereof. In particular, when the principle of this mode of the invention is applied to the contact lens according to the above-indicated mode (2) of the invention, the central zone of the back surface of the contact lens has a shape in the form of a smooth ellipsoidal surface of revolution in its entirety, which shape is to be transfer on the surface of the cornea. Since a minor axis of the ellipsoidal surface of revolution conforms to an axis of revolution, the peripheral portion of the central zone is located closely adjacent to the surface of the cornea. Therefore, the contact lens of this mode of the invention assures a desired corneal reshaping effect, while enhancing a positioning stability thereof relative to the cornea owing to a bearing effect of the contact lens on the surface of the cornea. Thus, the contact lens of the present mode of the invention is capable of reshaping the surface of the cornea into a desired shape with high stability.

(4) A contact lens according to any one of the above-indicated modes (1)–(3), wherein the central zone has a surface expressed by a quadric of revolution having a conic coefficient "k" of larger than 0. In this mode of the invention, the conic coefficient "k" is used to determine a configuration of a conic surface as well know in the art. That is, the surface of the central zone is expressed by the following known equation that is used to define a surface of revolution about a Z-axis in a three dimensional coordinate where X, Y, and Z axes are mutually orthogonal:

$$h^2 = x^2 + y^2$$
$$z = \left(ch^2 / (1 + (1-(k+1)c^2h^2)^{1/2})\right) + Ah^4 + Bh^6 + Ch^8 + Dh^{10}$$

where,
c is a center curvature; and
A, B, C, D are constants.

That is, the contact lens of the present mode of the invention has the central zone whose surface is arranged to satisfy the above indicated equation in which the conic coefficient: k, i.e., an aspherical coefficient in a term for expressing a second-order surface or a quadric of revolution is made larger than "0" (k>0). This makes it possible to effectively form the central zone having an ellipsoidal surface whose minor axis conforms to the center axis of the contact lens. Preferably, the value of the conic coefficient: k is held within a range of 1–9 ($0 \leq k \leq 9$). The central zone having such a specific ellipsoidal surface permits that the contact lens exhibits a further improved positioning stability thereof on the surface of the cornea. Thus, the contact lens of the present mode of the invention is effectively usable for the aforementioned orthokeratology treatment. Moreover, this arrangement of the present mode of the invention makes it possible to design the entire surface of the central zone of the contact lens according to a single equation, thus moderating difficulty in designing and calculating the shape of the back surface of the contact lens, while permitting the central zone to have a smooth surface over its entire area. Therefore, the contact lens according to the present mode of the invention eliminates or reduces a need for cutting and polishing the surface of the contact lens.

In one preferred form of the contact lens according to any one of the above-indicated modes (1)–(4) of the invention, the contact lens according to the mode (4) of the invention, the central zone of the back surface has a vertex radius of curvature that is made larger than a vertex radius of curvature of the surface of the cornea on which the contact lens is worn, while the peripheral portion of the central zone of the back surface has the radius of curvature that is made smaller than the radius of curvature of the corresponding peripheral portion of the surface of the cornea. Namely, the contact lens having the central zone dimensioned as described is capable of applying a pressing force on the vertex of the surface of the cornea with high stability, while effectively forming the annular tear reserving portion disposed around the vertex of the surface of the cornea. Therefore, the contact lens according to this preferred form of the invention can exhibit an excellent effect of the orthokeratology treatment for correcting myopia.

In another preferred form of the contact lens according to any one of the above-indicated modes (1)–(4) of the invention, the central zone of the back surface of the contact lens has the vertex radius of curvature that is made larger than the vertex radius of curvature of the surface of the cornea that is opposed to the back surface of the contact lens, while the peripheral portion of the central zone has the radius of curvature that is made smaller than the radius of curvature of the peripheral portion of the surface of the cornea that is opposed to the peripheral portion of the central zone of the back surface of the contact lens. This arrangement permits a further improved effect of the orthokeratology treatment.

In still another preferred form of the contact lens according to any one of the above-indicated modes (1)–(4) of the invention, the peripheral zone disposed around the central zone has a radius of curvature that is made larger than the radius of curvature of the peripheral portion of the central zone. This arrangement makes it possible to prevent the peripheral zone of the contact lens from being undesirably pressed onto the surface of the cornea or the sclera, and to effectively narrow or constrict the tear fluid layer at the peripheral portion of the central zone, while assuring a good wearing comfort as felt by the lens wearer.

In yet another preferred form of the contact lens according to any one of the above-indicated modes (1)–(4) of the invention, the central zone is connected at an peripheral portion thereof to the peripheral zone with a continuous surface which joins to the central zone along knots lying on tangents common to curves of the central zone and the continuous surface, and joins to the peripheral zone along knots lying on tangents common to curves of the peripheral zone and the continuous surface. In this arrangement, the back surface of the contact lens is smoothly and closely located adjacent to the surface of the cornea at the peripheral portion of the central zone where the clearance between the contact lens and the cornea is narrowed or minimized. As a result, the contact lens can be worn on the cornea with no or minimized adverse influence due to the contact of the back surface of the contact lens with the cornea, thus assuring a further improved wearing comfort as felt by the lens wearer. It should be appreciated that the continuous surface may be constituted by common tangent points in which the optical and the intermediate zones are directly connected to each other and lie on tangents common to both curves of the back surfaces of the central and peripheral zones, or alternatively may be constituted by a curved surface interposed between the central zone and the intermediate zone and lies on tangents whose slopes are continuously changed over its entire width including connecting points to the central zone and the peripheral zone as seen in the diametrical cross section of the lens.

In a further preferred form of the contact lens according to any one the above-indicated modes (1)–(4) of the invention, the peripheral zone has an outer diameter within a range of 8–16 mm. While contact lenses generally have a diameter smaller than 11 mm, the contact lens of the present invention is able to have a relatively large diameter. This arrangement permits that the eyelids of the lens wearer apply a relatively large pressing force on the upper surface of the contact lens, making it possible to position the contact lens on the cornea with further improved stability, and to further enhance lens wearing comfort as felt by the lens wearer, or alternatively making it possible to apply the contact lens to the orthokeratology treatment for further facilitating reshaping of the cornea with enlarged abutting pressure of the contact lens on the cornea. As is understood from the aforementioned description with respect to this preferred form of the invention, the contact lens of this preferred form is applicable to a sclera lens as well as a corneal contact lens.

In a still further preferred form of the contact lens according to any one of the above-indicated modes (1)–(4) of the invention, the central zone has a radial width within a range of 50–90% of a radius of the contact lens. This arrangement permits an optical zone formed in a central portion of the central zone to exhibit excellent optical characteristics in terms of acuity of viewing and visibility, while permitting the peripheral portion of the central zone to function for effectively positioning the contact lens on the surface of the cornea.

The contact lens constructed according to present invention may be manufactured according to various kinds of method of producing hard-type or soft-type contact lenses. For instance, the contact lens of the present invention may be manufactured by molding with a mold having a mold cavity whose profile corresponding to a desired profile of the contact lens. The contact lens of the invention may also be manufactured by injection molding, or alternatively by cutting in which a desirably shaped contact lens is cut out from a lens blank by utilizing techniques of turning. Further, a polishing process may be performed on the present contact lens as needed, like in the general process of manufacturing contact lenses.

BRIEF DESCRIPTION OF THE DRAWINGS

The above and optional objects, features, advantages and technical significance of the present invention will be better understood by reading the following detailed description of presently preferred embodiments of the invention, when considered in conjunction of the accompanying drawings in which.

DETAILED DESCRIPTION OF PREFERRED EMBODIMENTS

Figure 1:
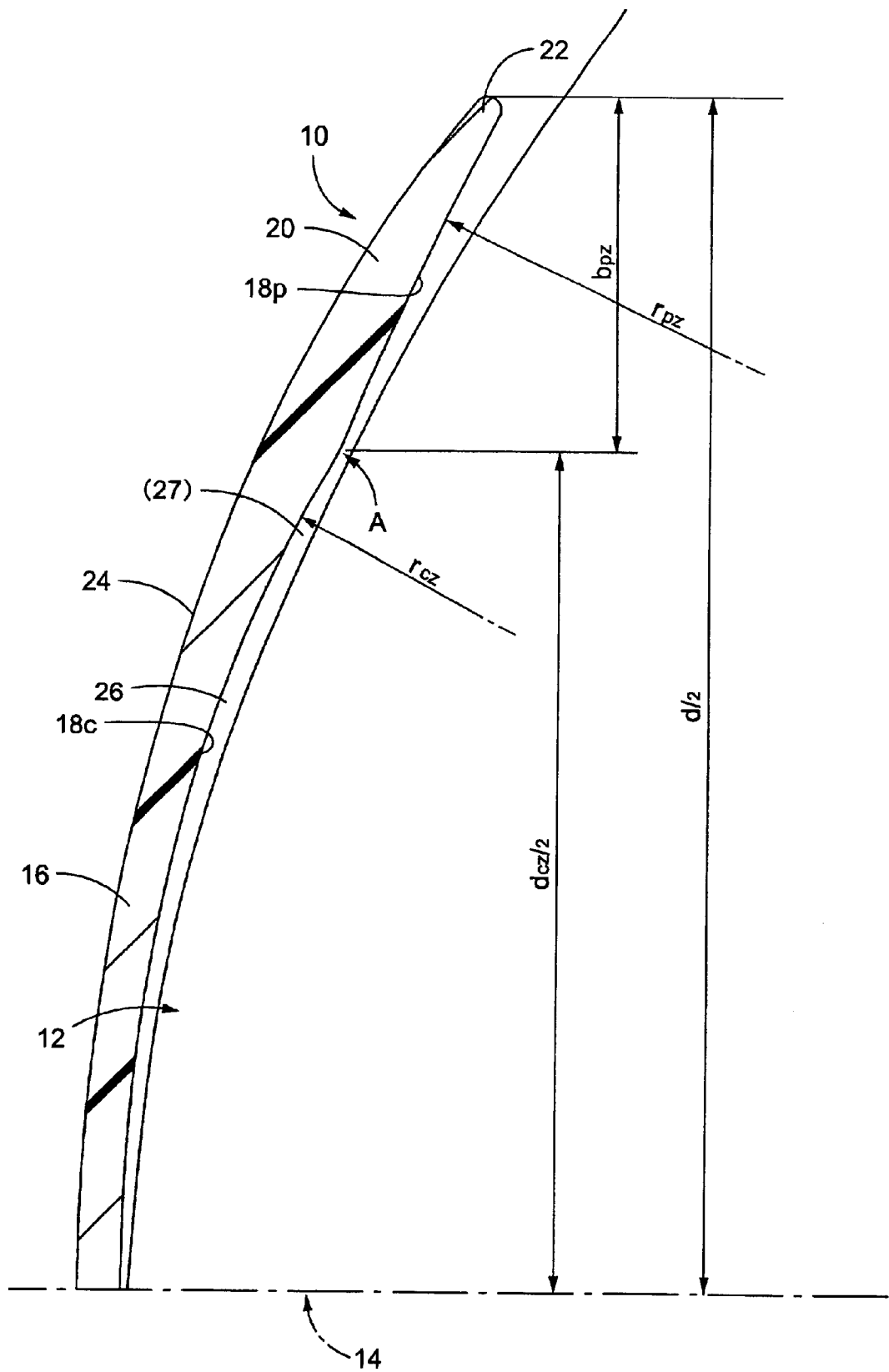
FIG. 1 is a fragmentary view in diametrical cross section of a contact lens according to a first embodiment of the present invention.
Figure 2:
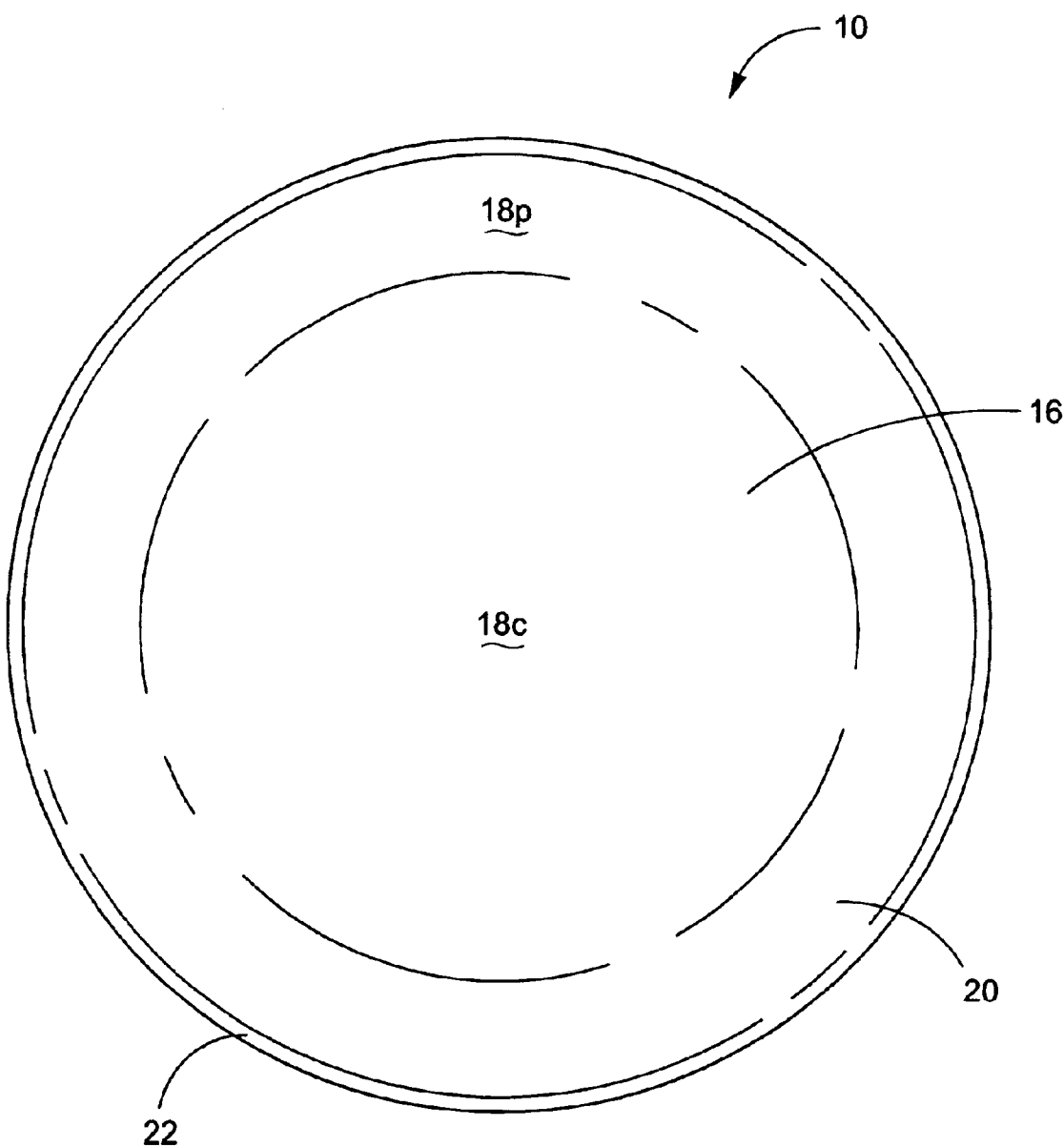
FIG. 2 is a rear elevational view of the contact lens of FIG. 1.

Referring first to FIGS. 1 and 2, there is shown a contact lens 10 constructed according to a first embodiment of the present invention. The contact lens 10 has a generally dome shape in its entirety, and is adapted to be worn on a cornea 12 of a lens wearer with its back surface held in contact with a surface of the cornea via tear fluid. The contact lens 10 has a center axis 14 substantially conform to an optical axis of the lens, and is shaped as a solid of revolution about the center axis 14. For the sake of this geometrical feature of the contact lens 10, FIG. 1 shows only a symmetrical half of the contact lens 10 in its diametrical cross section.

More specifically described, the contact lens 10 includes a central zone 16 formed in its central portion. Almost all area of the central zone 16 except its peripheral portion serves for providing an optical zone. The term "optical zone" should be interpreted to mean a zone functions for transmitting light to a pupil while compensating or correcting optical characteristics of the eye of the lens wearer. This central zone 16 has a circular shape as seen in a front view of the contact lens 10, and has a center located on the center axis 14. The central zone 16 has a diameter: $d_{cz}$ which is made substantially equal to a value of 65% of a diameter: d of the contact lens 10.

The contact lens 10 further includes a peripheral zone 20 formed in its peripheral portion. This peripheral zone 20 has an annular shape as seen in the front view of the contact lens 10, whose center is located on the center axis 14 of the contact lens 10, and whose radial width dimension: $b_{PZ}$ is made substantially equal to a value of 35% of the radial dimension: d/2 of the contact lens 10. The contact lens 10 yet further includes an edge 22 formed in its outer most peripheral portion and contiguous with an outer circumferential portion of the peripheral zone 20. The edge 22 circumferentially extends over an entire circumference of the contact lens 10 with a generally semi-circular cross sectional shape. The edge 22 smoothly connects the back surface 18 and the front surface 24 with each other.

The contact lens 10 has a back surface 18 whose center of curvature is located on the center axis 14 at the back side of the contact lens 10 (at the right-hand side of FIG. 1). That is, the back surface 18 is formed in a generally concave spherical shape in its entirety, so as to serve as a surface with which the contact lens is placed on a surface of the cornea 12. A front surface 24 of the contact lens 10, on the other hand, has a center of curvature that is located on the center axis 14 at the backside of the contact lens 10, and that is formed in a generally spherical convex shape in its entirety.

A peripheral portion of the back surface 18, namely, a back surface 18p of the peripheral zone 20 is formed in a spherical shape with a radius of curvature: $r_{PZ}$ that is made larger than a radius of curvature of a surface of the cornea 12 so that a clearance between the back surface 18p and the surface of the cornea 12 gradually slightly increases toward the edge 22 of the contact lens 10. The front surface 24 has a shape that is determined so that the optical zone of the central zone 16 imparts to the contact lens 10 a desired refraction power that varies among individual wearers. For instance, the shape of the front surface 24 may be determined according to a known optical calculation formula, a know ray tracing method or the like. More specifically, the front surface 24 may be formed in a spherical shape with a radius of curvature that is made substantially constant over an entire surface, or alternatively in an aspherical shape with a radius of curvature that varies gradually or continuously in a diametrical or lateral direction of the contact lens 10. The shape of the front surface 24 is determined as described above, while taking into account the shape of the back surface 18 at the central zone 16, and the shape of the surface of the cornea 12 as needed.

A central portion of the back surface, i.e., a back surface 18c of the central zone 16 is a conic surface and a second-order surface of revolution about the center axis of the lens 14. The specific configuration of the back surface 18c of the central zone 16 is determined by coordinate values (x, y, z) in the orthogonal coordinates (X, Y, Z) where the Z-axis conforms to the center axis 14 of the contact lens 10, which is obtained by the following equations:

$$h^2 = x^2 + y^2$$
$$z = \left(ch^2 / (1 + (1 - (k+1)c^2h^2)^{1/2})\right)$$

where c is a central curvature that represents a curvature of the back surface 18 on the center axis 14 of the contact lens 10, and k is a conic coefficient as one kind of aspherical coefficients. As well known in the art, the conic surface expressed by the above-indicated equation has following various kinds of shapes depending upon values of the conic coefficient.

a) k>0

The conic surface is an ellipsoidal surface whose minor axis conforms to an optical axis, and has an ellipsoidal shape in diametric cross section whose minor axis conforms to the center axis 14 of the contact lens 10.

b) k=0

The conic surface is a spherical surface having an arcuate shape in diametric cross section.

c) 0>k>−1

The conic surface is a spherical surface whose major axis confirms to an optical axis, and has an ellipsoidal shape in diametric cross section whose major axis conforms to the center axis 14 of the contact lens 10.

d) k=−1

The conic surface is a parabolic surface, and has a parabolic shape in diametric cross section whose axis of symmetry confirms to the center axis 14 of the contact lens 10.

e) k<−1

The conic surface is a hyperbolic surface, and has a hyperbolic shape in diametrical cross section whose axis of symmetry confirms to the center axis 14 of the contact lens 10.

In the present embodiment, the above-indicated equation preferably has a value of the conic coefficient that is greater than 0 (k>0), more preferably within a range of 1–9 ($1 \leq k \leq 9$). Thus, the back surface 18c of the central zone 16 determined according to the above-indicated equation is formed with an ellipsoidal surface whose minor axis conforms to the center axis 14 of the contact lens 10. Accordingly, the back surface 18c of the central zone 16 has a curvature that is minimized on the center axis 14 of the contact lens 10 and gradually continuously increases with an increase in a radial or lateral distance from its center toward its periphery, i.e., in the radially outward direction.

In particular, the back surface 18c of the central zone 16 has a center curvature: c at a vertex of the central zone 16 on the center axis 14 is made smaller than a center curvature at a vertex of the cornea 12. In other words, the contact lens 10 according to the present embodiment is arranged to have a center radius of curvature 1/c on the center axis 14 thereof that is made larger than a center radius of curvature of the vertex of the cornea 12.

As is apparent from an enlarged cross sectional view of the contact lens 10 of FIG. 1, the contact lens 10 of this embodiment is arranged to have the center radius of curvature: 1/c of 7.8 mm and the conic coefficient (k) of 2.0. In this case, the central zone 16 has a radius of curvature: $r_{CZ}$ that is made smaller at its peripheral portion than that of the surface of the cornea 12. The center radius and the conic coefficient of the central zone 16 may be suitably determined so that the central zone 16 does not cause undesirable pressure or stimulation concentration on the corresponding portion of the surface of the cornea 12, while taking into account a determined radius dimension: $d_{CZ}/2$, a radius of curvature of the cornea 12, or the like.

In the present embodiment, preferably, the peripheral portion of the central zone 16 is connected to an inner circumferential portion of the peripheral zone 20 with a continuous surface in the form of a connecting portion "A" having an outwardly curved surface that protrude outwardly (backwards of the contact lens 10). The connecting portion "A" joins to the central zone 16 along knots lying on tangents common to curves of the central zone 16 and the connecting portion "A", and joins to the peripheral zone 20 along knots lying on tangents common to curves of the peripheral zone 20 and the connecting portion "A". In this preferred arrangement, the overall back surface 18 of the contact lens including the central zone 16 and the peripheral zone 20 is formed with a smooth junctionless continuous curve as seen in a diametric cross section of the contact lens 10.

A material for the contact lens 10 constructed as described above may be preferably selected from suitable rigid gas-permeable materials (RGPL). The contact lens 10 may be formed by molding with a mold, or alternatively by cutting and polishing.

The contact lens 10 constructed according to the present embodiment as described above is worn on the surface of the cornea 12 with the peripheral portion of the central zone 16 protrudes toward the surface of the cornea 12 due to the reduced radius of curvature thereof. That is, the peripheral portion of the central zone 16 is located most closely adjacent to the surface of the cornea 12, and an abutting pressure of the contact lens 10 applied on the cornea 12 is maximized or concentrated at the peripheral portion of the central zone 16. In particular, when an upper and a lower eyelids (not shown) of the lens wearer cover the periphery of the contact lens 10, and when the lens wearer blinks and his or her eyelids covers the contact lens 10 entirely, the eyelids of the lens wearer applies a pressing force on the front surface 24 of the contact lens 10. Owing to this pressing force applied on the front surface 24 of the contact lens 10, the peripheral portion of the central zone 16 is substantially held in contact with the surface of the cornea 12. Thus, the contact lens 10 is stably positioned on the surface of the cornea 12.

As a result, the abutting pressure of the contact lens 10 is concentrically acts on the underlying cornea 12 at the peripheral portion of the central zone 16. This may cause a deformation of the cornea 12 due to the pressing force applied on the cornea 12 as the case may be. Owing to the abutting pressure concentrically generated at the peripheral portion of the central zone 16, the contact lens 10 is effectively positioned on the cornea 12, and an amount of displacement of the contact lens 10 on the cornea 12 is effectively eliminated or reduced.

Therefore, the contact lens 10 according to the present embodiment is capable of minimizing the amount of displacement thereof relative to the cornea 12, while alleviating discomfort as felt by the lens wearer owing to the minimized displacement thereof over the cornea 12, resulting in improved lens wearing comfort.

In addition, the tear fluid layer 26 existing between the contact lens 10 and the cornea 12 is constricted at the outer circumferential portion of the contact lens 10 due to the presence of the protruding peripheral portion of the central zone 16. Owing to the radially outer constricted part of the fluid layer 26 as well as the limited movement of the contact lens 10 over the cornea 12, the entrance of the dust or other floating objects in the atmosphere into the tear fluid layer 26 can be effectively prevented or restricted, resulting in a further improved wearing comfort and usability of the contact lens 10.

As is understood from FIG. 1, the contact lens 10 constructed according to the present embodiment can be shaped such that a clearance between the back surface 18 of the contact lens 10 and the surface of the corneal 12 is made large at an outer circumferential portion of the cornea 12 rather than the central portion of the cornea 12. For the sake of this geometrical characteristic of the contact lens 10, the contact lens 10 can be usable in the orthokeratology treatment for correcting myopia, by suitably adjusting the curvature of the back surface 18 of the contact lens 10 according to the curvature of the cornea 12. Where the contact lens 10 is used in the orthokeratology treatment for correcting myopia, the central portion of the central zone 16 is pressed onto the surface of the underlying cornea 12 in order to reshape the surface of the cornea, and an outer circumferential portion of the central zone 16, which is located radially inward of the peripheral portion of the central zone 16, is spaced away from the surface of the cornea 12 so as to form therebetween an annular tear fluid reserving portion 27.

According to the present embodiment, the overall central zone 16 including an optical zone provided in its central portion and an alignment zone provided in its peripheral portion can be expressed in terms of the above-indicated single equation. Namely, the overall central zone 16 is formed with a surface of revolution of a curve that is expressed by the above-indicated single equation. This arrangement eliminates a need for providing an intermediate zone disposed between the optical zone and the alignment zone, which is designed independently of these zones, thus facilitating lens design and manufacture. This makes it possible to fabricate the contact lens 10 with improved efficiency and accuracy.

Figure 3:
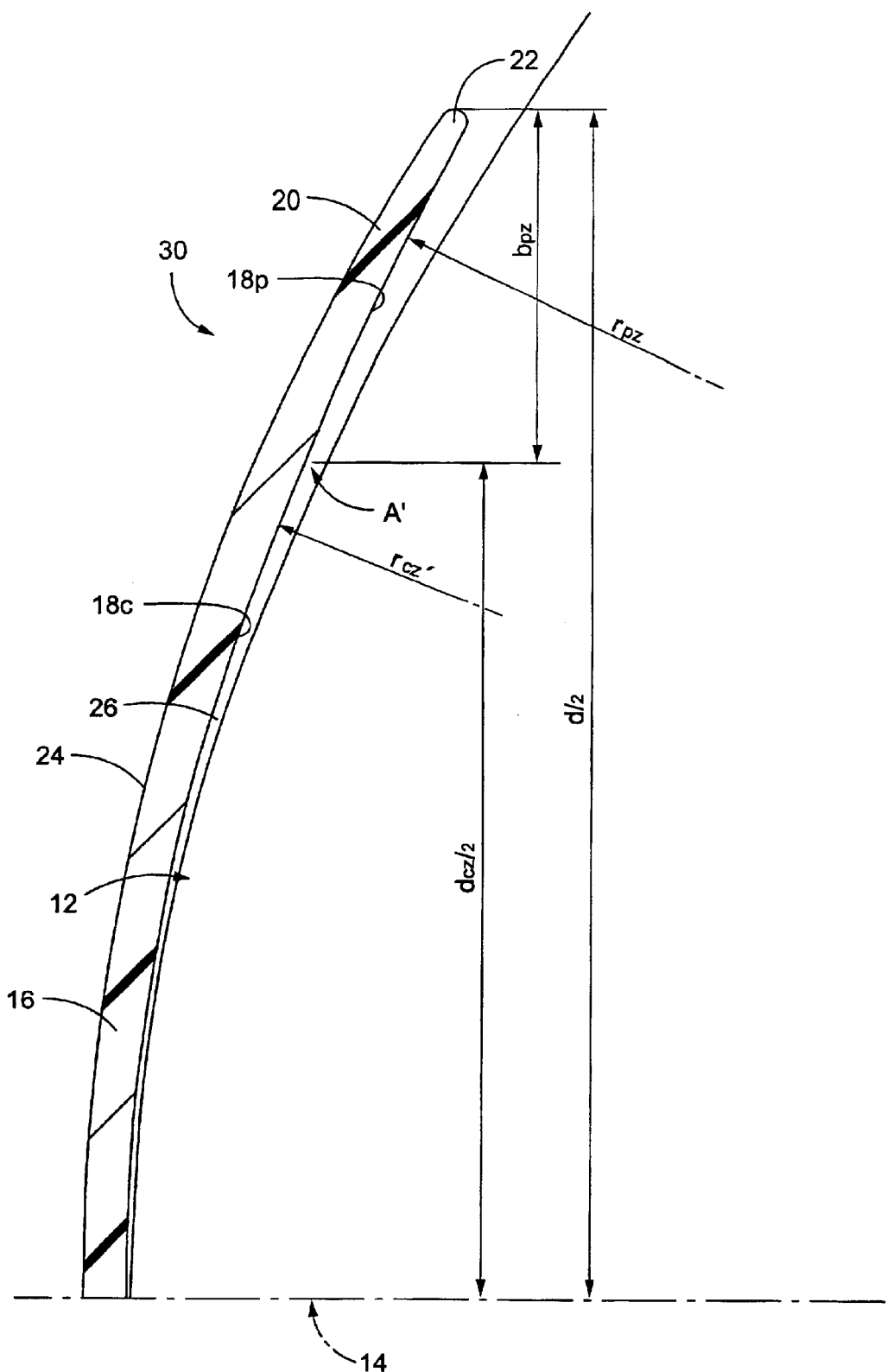
FIG. 3 is a fragmentary view in diametrical cross section cross section of a contact lens according to a second embodiment of the present invention.

Referring next to FIG. 3, there is shown a contact lens 30 constructed according to a second embodiment of the present invention, which is usable for a general myopia correction treatment. The same reference numerals as used in the first embodiment will be used in this embodiment to identify the functionally corresponding or structurally similar elements, which will not be described in detail to avoid redundancy of description.

Described in detail, the contact lens 30 is different from the contact lens 10 of the first embodiment in a manner for defining a configuration of the central zone 16. Namely, the contact lens 30 is made substantially similar to the contact lens 10 in terms of the center curvature: c of the central zone 16, and is made different from the contact lens 10 in terms of the conic coefficient: k as the aspherical coefficient. A rate of change in curvature at the back surface 18 of the contact lens 30 is made smaller than that in the contact lens 10 of the first embodiment. Namely, the contact lens 30 has the center radius of curvature (1/c) of 7.8 mm, and the conic coefficient (k) of 0.5. In this case, a radius of curvature: $r_{CZ'}$ as measured at the peripheral portion of the central zone 16 of the contact lens 30 is made larger than the corresponding radius of curvature: $r_{CZ}$ in the contact lens 10, and is made substantially equal to or slightly smaller than the radius of curvature of the surface of the cornea 12.

Like the contact lens 10, the outer peripheral portion of the central zone 16 of the contact lens 30 is smoothly connected to the inner circumferential portion of the peripheral zone 20 with a continuous surface in the form of knots "A'" lying on tangents common to both curves of the central zone 16 and the peripheral zone 20.

With the contact lens 30 worn on the cornea 12, the central portion of the central zone 16 is located most closely adjacent to the surface of the cornea 12. In this condition, the central portion of the optical zone 16 is forcedly pressed onto the surface of the cornea 12, upon application of an external pressing force on the front surface 24 of the contact lens 30, by the eyelids of the lens wearer as described above, for example. Further, the radius of curvature of the back surface 18c of the central zone 16 gradually decreases from its intermediate portion toward its peripheral portion. Therefore, the peripheral portion of the central zone 16 functions to concentrically apply a pressure on the underlying cornea 12, making it possible to transfer an optically optimal shape onto the surface of the cornea 12.

Moreover, the back surface 18 of the contact lens 30 gradually protrudes toward the cornea 12 at the peripheral portion of the central zone 16. The peripheral portion of the central zone 16 effectively applies pressing force on the surface of the cornea 12 when the contact lens 30 is worn on the cornea with the overall back surface 18 pressed on the surface of the cornea 12, even in the case where the center curvature of the central zone 16 is smaller than that of the cornea 12. Thus, the contact lens 30 can be effectively positioned on the surface of the cornea 12 by means of the pressing force generated at the peripheral portion of the central zone 16.

As is understood from the aforementioned description, the contact lens 30 constructed according to the present embodiment is capable of reshaping the cornea 12 on the basis of the pressing force that is applied by the central portion of the central zone 16 on the underlying cornea 12. Therefore, a given-term wearing of the contact lens 30 makes it possible to desirably change a refraction power of the cornea 12 itself, thus assuring a correction or moderation of the myopic condition of the lens wearer even after a removal of the contact lens 30 from the cornea 12.

In the contact lens 30 of the present embodiment, the radius of curvature of the back surface 18c of the central zone 16 gradually decreases from its center toward its periphery, thereby preventing or restricting an increase of a distance of the clearance between the peripheral portion of the central zone 16 and the cornea 12. Thus, the contact lens 30 of the present embodiment is capable of applying a sufficiently large pressing force at the central portion of the central zone 16 on the underlying cornea 12 for exhibiting an excellent cornea reshaping effect, while applying a sufficiently large pressing force at the peripheral portion of the central zone 16 on the underlying cornea 12 for effectively positioning the contact lens 30 on the surface of the cornea 12. Accordingly, the contact lens 30 is able to effectively and stably exhibit an excellent cornea reshaping effect for desired orthokeratology treatment.

While the presently preferred embodiments of the invention have been described above in detail for illustrative purpose only, it is to be understood that the invention is not limited to the details of the illustrated embodiment, but may be otherwise embodied.

For instance, the back surface 18b of the peripheral zone 20 may have a wide variety of shapes without any specific limitations. For instance, the peripheral zone 20 may have a radius of curvature that gradually varies in the diametric or lateral direction of the contact lens 30.

In the illustrated embodiments, the peripheral portion of the central zone 16 and the inner circumferential portion of the peripheral zone 20 join together along connecting portion "A" or knots lie on tangents common to both curves of the central zone 16 and the peripheral zone 20, in the back surface 18 of the contact lens 10, 30. This arrangement is not essential to practice of the present invention. For instance, the central zone 16 and the peripheral zone 20 may possibly join together with junctions.

It should be appreciated that shapes, areas, radius of curvatures of respective portions of a contact lens of the invention, such as the central zone 16 and the peripheral zone 20, and a correlation between sizes of these portions are desirably determined. Namely, the optical zone 16 and the peripheral zone 20 are not particularly limited to the illustrated embodiment, but may otherwise be modified or changed as needed, taking into account individual conditions of lens wearers, e.g., condition of a cornea, a kind of required correction, or the like.

It is also to be understood that the present invention may be embodied with various other changes, modifications and improvements, which may occur to those skilled in the art, without departing from the spirit and scope of the invention defined in the following claims.

What is claimed is:

1. A contact lens having a back surface adapted to face a cornea, wherein said back surface comprising:

a generally circular central zone; and
   an peripheral zone disposed around said central zone,
   said central zone having a radius of curvature gradually decreasing from a center thereof toward a periphery thereof.

2. A contact lens according to claim 1, wherein said central zone has an outer circumferential adapted to cooperate with a surface of said cornea to form an annular tear fluid reserving portion therebetween, and a central portion adapted to apply pressure on said surface of said cornea in order to reshape said cornea.

3. A contact lens according to claim 1, wherein said central zone has an ellipsoidal shape in diametrical cross section of said contact lens, whose minor axis extends substantially parallel to a center axis of said contact lens.

4. A contact lens according to claim 1, wherein said central zone has a surface expressed by a quadric of revolution having a conic coefficient of larger than 0.

5. A contact lens according to claim 4, wherein said quadric of revolution having a conic coefficient within a range of 1–9.

6. A contact lens according to claim 1, wherein said central zone has a vertex radius of curvature larger than a vertex radius of curvature of a surface of said cornea.

7. A contact lens according to claim 1, wherein a peripheral portion of said central zone has a radius of curvature smaller than a radius of curvature of a corresponding portion of a surface of said cornea to which said peripheral portion of said central zone is opposed.

8. A contact lens according to claim 1, wherein said peripheral zone has a radius of curvature larger than a radius of curvature of a peripheral portion of said central zone.

9. A contact lens according to claim 1, wherein said central zone is connected at an peripheral portion thereof to said peripheral zone with a continuous surface which joins to said central zone along knots lying on tangents common to curves of said central zone and said continuous surface, and joins to said peripheral zone along knots lying on tangents common to curves of said peripheral zone and said continuous surface.

10. A contact lens according to claim 1, wherein said peripheral zone has an outer diameter within a range of 8–16 mm.

11. A contact lens according to claim 1, wherein said central zone has a radial width within a range of 50–90% of a radius of said contact lens.

12. A contact lens according to claim 1, wherein said central zone has a vertex radius of curvature that is made larger than a vertex radius of curvature of a surface of said cornea, and a peripheral portion of said central zone has a radius of curvature that is made smaller than a radius of curvature of a corresponding peripheral portion of said surface of said cornea, said contact lens being used for an orthokeratology treatment.

\* \* \* \* \*